Patented Aug. 29, 1944

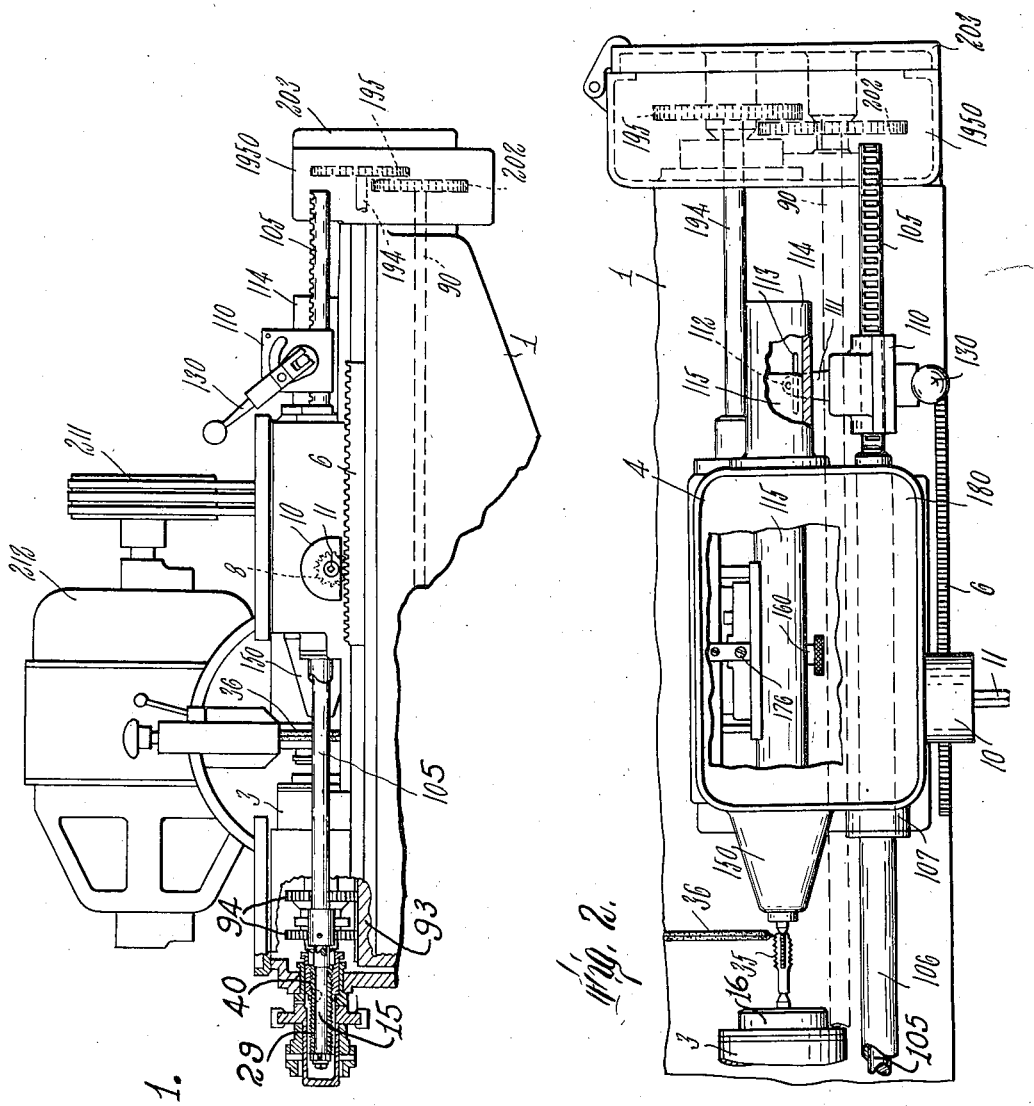

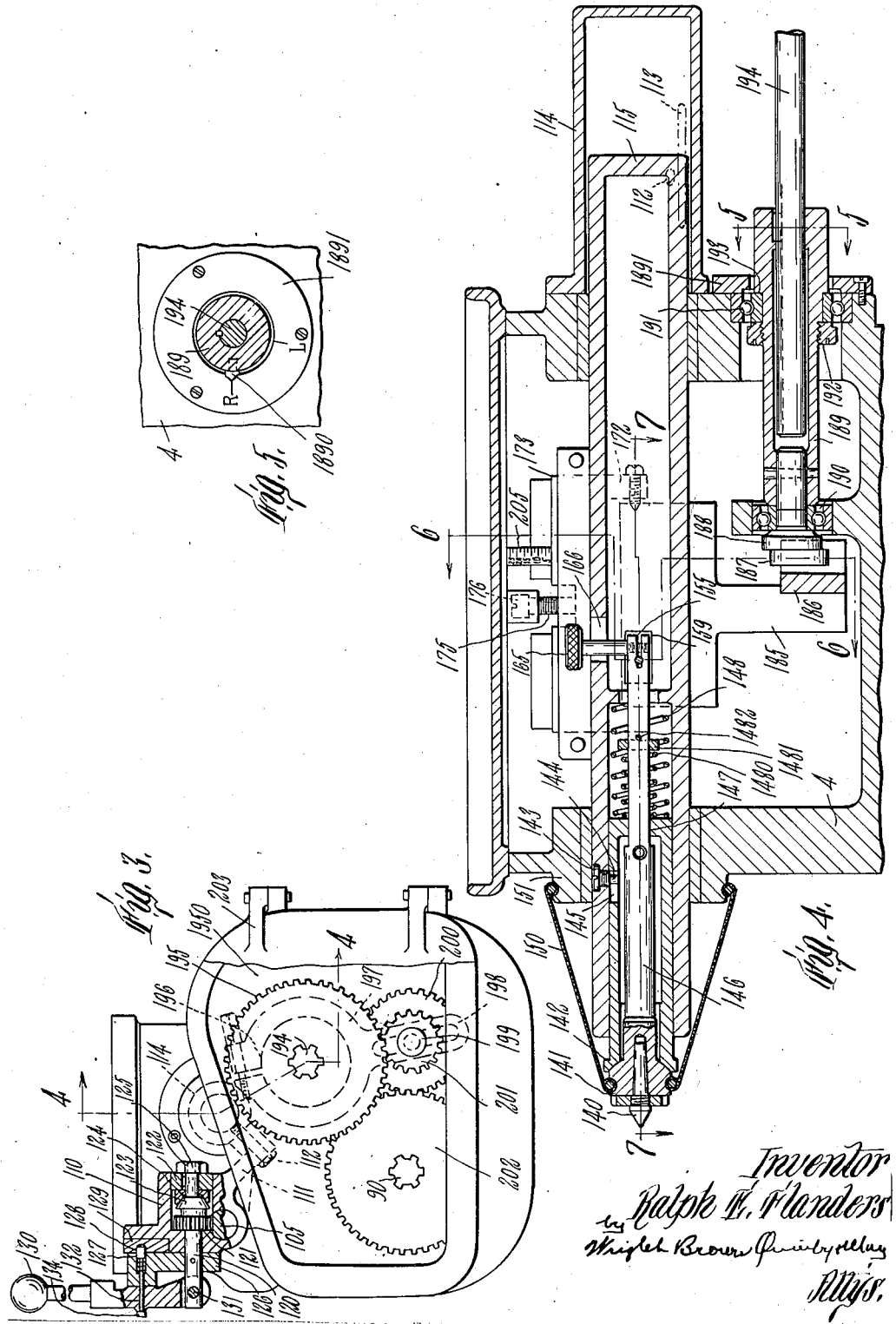

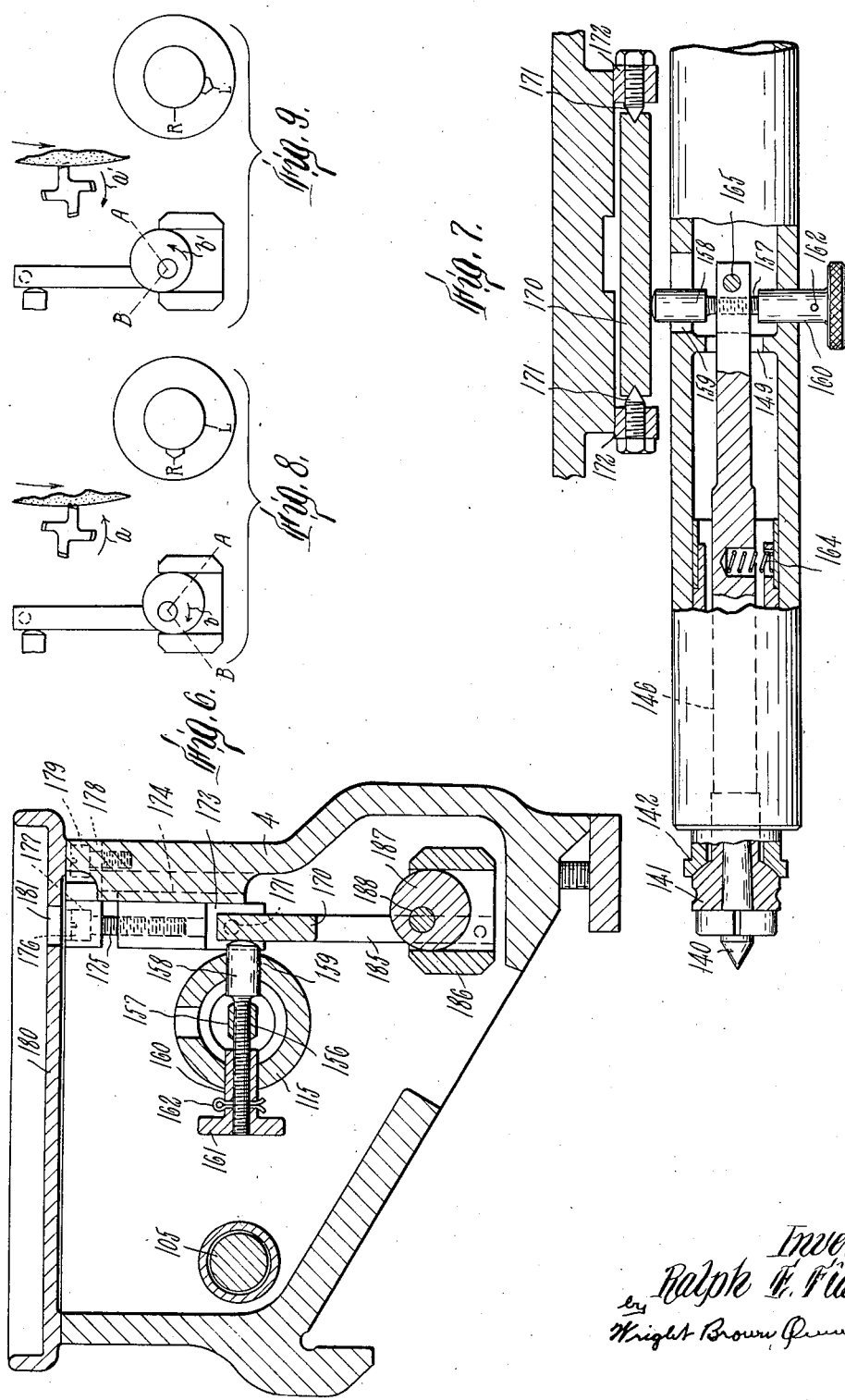

2,356,839

UNITED STATES PATENT OFFICE 2,356,839

TAILSTOCK

Ralph E. Flanders, Springfield, Vt., assignor to Jones & Lamson Machine Company, Springfield, Vt., a corporation of Vermont Application August 26, 1941, Serial No. 408,368

14 Claims. (Cl. 51—237)

This invention relates to machine tailstocks for supporting one end portion of work, the other end portion of which is supported for rotation in a headstock.

One of the objects of this invention is to provide a tailstock having a work spindle for supporting the tailstock end of the work, this spindle being axially movable relative to the tailstock, the tailstock also being adjustable on the bed of the machine in the same direction as the axial movement of the spindle.

A further object of the invention is to provide a mounting for the tailstock center within the spindle for limited yielding axial motion and to provide for lateral motion of the work engaging portion of the center to provide for relief on the lands where fluted work such as a tap or reamer is being held by the machine for grinding or other machining operations to be performed thereon.

Still another object is to provide novel and improved means for producing such relieving motion in time with the rotation of the fluted work.

For a more complete understanding of this invention, together with other objects and advantages, reference may be had to the accompanying drawings in which Figure 1 is a fragmentary front elevation of a grinding machine embodying the invention.

Figure 2 is a fragmentary top plan view of the same.

Figure 3 is a partial left hand elevation of the same partly broken away.

Figure 4 is a detail section on line 4—4 of Figure 3.

Figures 5, 6 and 7 are detail sectional views on the correspondingly numbered section lines of Figure 4.

Figures 8 and 9 are diagrammatic views illustrating the relationship between right and left hand taps, respectively, and the corresponding adjustments of indicating means and the relief cam when starting grinding of the tap lands.

Referring to Figures 1 and 2, at 1 is indicated a machine base provided with longitudinally extending ways upon which are mounted a headstock 3 and a tailstock 4, adjustable along the ways. In order to so adjust the tailstock the bed is provided with a rack bar 6 and the tailstock is provided with a pinion 8 meshing with the rack bar 6 and supported within a casing 10 secured to the tailstock. A squared shaft 11 carrying the pinion 8 extends outwardly for the reception of a wrench or handle by which it may be turned to adjust the tailstock axially as may be desired. The tailstock may be secured in adjusted position by any suitable means (not shown) as is well known in the art.

The headstock 3 may be similarly adjusted and secured, as shown in my application for patent Serial No. 353,050, filed August 17, 1940, for Grinding machine, of which the present application is a continuation in part. As shown in the parent application the headstock is provided with an axially movable spindle 15 carrying a work holding face plate 16 and this spindle is moved axially as through a lead screw 29 and a cooperating fixed nut 40 having the same lead as the work to be operated upon, which is shown as a tap 35, the threads of which are to be ground by the grinding wheel 36. The axial motion of the work spindle as it is rotated with the lead screw, is caused to produce a like axial motion of the tailstock spindle 115 relative to the tailstock. This is done by suitable operative connections from the headstock spindle to an axially movable bar 105 which extends into the tailstock casing as through a suitable packing gland at 107. This connection includes a yoke member 101 fixed to the bar 105 and straddling a bearing member 99 carried by a gear 94 secured to the spindle. The spindle is rotated through the gear 94 by a suitably driven long gear 93. The rear end of the bar 105 is formed as a rack bar and slidable on this bar 105 at the rack portion is a casing 110 (see Figures 1, 2 and 3). This casing has a rearward extension 111 through which is passed a bolt 112 extending through a slot 113 in a cap 114 (see Figures 2 and 4) which houses the rear end of a tailstock spindle 115 slidably but non-rotatably mounted in the tailstock 4.

Means are provided for clamping the casing 110 to the rack bar 105 so that as the rack bar is moved axially with the headstock spindle, the tailstock spindle is moved correspondingly in the same direction. To this end the casing 110 is provided with a rock shaft 120 on which is journaled a pinion 121 which meshes with the teeth of the rack bar 105. This rock shaft 120 has keyed thereto a ring 122 and between the ring 122 and a friction cone 123 integral with or secured to the pinion 121 is a friction shoe 124 which may be pressed up against the cone 123 to an adjustable extent as by a nut 125 threaded on the inner end of the rock shaft 120. Thus the pinion 121 is frictionally held to the rock shaft. This rock shaft extends through the forward face of the casing 110 where it has secured thereto an arm 126, the outer end of which carries a spring latch pin 127 which may be engaged in a latch pin socket 128 in a face plate 129 carried by the casing 110. This latch may be released from its socket by pulling outwardly on a handle 130 fulcrumed at 131 on the rock shaft 120 and through which a shank 132 of the latch pin 127 projects, this shank having a head 134 on its forward end. By pulling outwardly on the handle 130 the latch pin may be retracted from its socket 128 and then by rocking this handle to the right as viewed in Figure 1 about the axis of the shaft 120, the shaft 120 may be turned, thus turning the pinion 121 and producing a corresponding retraction of the tailstock spindle. This provides for retracting the tailstock spindle for the removal and insertion of work between the spindles. In the normal operative condition the handle is in the position shown in Figure 1 and is latched in this position, in which position also the head and tailstock spindles are connected to the rack bar 105 for simultaneous and equal axial motion, thus carrying the work 35 and effecting the lengthwise traverse of it with relation to the grinding wheel 36.

The tailstock spindle carries the cone center 140, which as shown in Figure 4, is carried by a tailstock center block 141. In grinding a tap it is desirable that the lands of the tap be relieved in order to provide clearance back of the cutting edges of the tap, and for this purpose a motion of the tap from and toward the grinding wheel in time with the rotation of the tap is provided. As shown this relief is produced by a motion of the tailstock center. To this end the center block 141 is rockably mounted in the forward end of a sleeve 142 slidable axially within the tailstock spindle 115. This sleeve 142 is keyed to the spindle 115, for this purpose a screw plug 143 being provided which is threaded into a side wall of the spindle 115 and has a reduced extremity 144 riding in a slot 145 in the sleeve 142. The shank 146 of the center block 141 extends rearwardly in the sleeve 142 and through a slot 147 in its rear end. To the rear of this sleeve 142 is positioned a coil spring 148 which reacts between the rear end of this sleeve and a transverse partition 149 of the spindle 115, this acting to press the sleeve 142 forwardly and carrying with it the center 140 so as to hold the work snugly between the head and tailstock centers. A second spring 1480, also surrounding the shank 146, bears at one end against the rear end of the sleeve 142 and against a collar 1481 engaging a transverse pin 1482 extending through the shank 146. This spring 1480 holds the center block 141 with its concave rear face into engagement with the forward end of the sleeve 142, while permitting rocking motion of the block 141. The tailstock center is arranged to be rocked about its bearing against the end of the sleeve 142 to produce the relieving action.

To prevent the entrance of coolant and foreign matter into the tailstock, a conical flexible shield 150 is secured at its forward end to the center block 141 and to its rear end to a boss 151 of the tailstock.

The rear end of the shank 146 is split as at 155 and has a threaded opening 156 to receive a screw 157 (Figures 6 and 7) provided with a head 158 which screw extends through a slot 159 through the spindle 115. On the forward end of the screw 157 is threaded a sleeve 160 having a knurled head 161 at its forward end. This sleeve 160, as shown in Figure 6, is secured to the screw 157 as by a cotter pin 162. The split ends 155 are clamped together as by the thumb screw 165 which extends through a slot 166 in the top of the spindle 115 so that it may be accessible for actuation to clamp or release the screw 157. By adjustment of the screw 157 the tailstock center may be adjusted laterally for parallel or tapered work as may be desired. In the case of taps it is common practice to provide for taper with the end diameter larger so that all of the cutting is done by the first few teeth.

The head 158 is pressed by a spring 164 against the face of the lever 170 pivoted between a pair of centers 171 fixed in a pair of oppositely disposed ears 172 of a slide 173. This slide, as best shown in Figure 6, is mounted for vertical sliding movement in a guideway 174 in the rear wall of the tailstock 4 and it may be vertically adjusted by means of a screw 175 threaded thereinto and provided with a head 176 positioned in a recess 177 in a block 178. This block 178 is secured to the rear wall of the casing 4, as by means of a screw 179. The cover 180 of the tailstock casing is provided with an opening 181 in substantial alinement with the head 176 and through which this head is accessible to a screwdriver in order to adjust the slide 173 vertically. This adjustment determines the effective amplitude of motion of the head 158 and thus of the dead center 140 for the relieving action for a given amplitude of swinging motion of the lever 170. When the axis of the centers 171 is in axial alinement with the head 158, swinging motion of the lever 170 is ineffective to oscillate the center block 141 and the center 140, but as the slide 173 is moved upwardly, the amplitude of this relieving motion of the center 140 is increased. The lower end of the lever 170 is formed as a narrowed depending tail 185 (see Figures 4 and 6) to the lower end of which is secured a U shaped guide 186 between the sides of which is positioned an eccentric 187 for bearing on opposed walls thereof. This eccentric 187 is secured to the forward extremity of a stub shaft 188 which is pinned to and within a sleeve 189. This sleeve is journaled in bearings 190 and 191 and is held in axial position by a nut 192 on one side of the bearing 191 which holds this against an annular shoulder 193 of the sleeve 189.

Keyed for longitudinal but non-rotative motion relative to the sleeve 189 is a shaft 194. This shaft 194 extends into a change gear casing 1950 at the tailstock end of the machine (see Figures 1, 2 and 3). On the splined end of this shaft 194 is a gear 195, and clamped to a boss 196 through which the shaft 194 passes is a hanger 197 having a slotted arm 198 for the reception of a stub shaft 199. This stub shaft carries the change gears 200 and 201, the gear 201 meshing with the gear 195 and the gear 200 meshing with a gear 202 on the splined rear end of the shaft 90. A hinged cover 203 provides access to this train of gears so that the speed ratio between the shafts 194 and 90 may be adjusted as desired. Thus for each revolution of the drive shaft 90 and consequently rotation of the work spindle, the correct number of oscillations of the dead center 140 may be produced depending upon the number of flutes in the tap being ground and thus produce a relief on each of the lands between the flutes.

In order to properly relate the direction of relief for right and left hand taps, provision is made for indicating the correct angular position of the cam 187 when a cutting edge of the tap is in the plane of the work and wheel centers. To this end the sleeve 189 is provided with a pointer 1890 which may be turned into registry with the proper mark R or L, angularly spaced, on a ring member 1891 secured as by screws to the tailstock of the machine. This adjustment for right or left hand taps may be done only when the change gears 200 and 201 are out of mesh with one or both of their mating gears, as it requires the turning of the shaft 194 to which the sleeve 189 is keyed relative to the shaft 90.

In setting up for a right hand tap, for example, the slide 173 is adjusted so that the pivots 171 are opposite to the center of the screw 157, in which position the top of the slide 173 is opposite the zero indication on the scale 205 (Figure 4). Thus adjusted, the grinding will be concentric and with or without taper, depending on the setting of the screw 157. The machine can then be adjusted so that the top is automatically sized to the proper diameter. Then the top is adjusted angularly to bring a cutting face to a predetermined angular position (which may be determined by any suitable gaging means not shown) and dogged in that position. The sleeve 189 is then adjusted to bring the pointer at 1890 in line with the letter R and the change gears are then brought into mesh. The slide 173 is then moved to the position to give the desired eccentricity for relief. The extent of eccentricity is determined by the setting of the slide 173, while the start of the oscillation producing the eccentricity is determined by the setting of the screw 157. Each succeeding tap is dogged when in the same angular position of a cutting edge.

In grinding taps it is better practice to have the wheel first contact at the cutting edge of each land. This is for the reason that when cutting the width of the land the heat increases and faster grinding without injury by over-heating the cutting edge is then possible. Therefore the direction of rotation of the tap is reversed when grinding left hand taps, the direction for right and left hand taps being indicated by the arrows $a$ and $a'$, respectively, in Figures 8 and 9. Since the relieving cam 187 is geared to the work spindle, the direction of rotation of this cam is also reverse in accordance with the arrows $b$ and $b'$, respectively, of Figures 8 and 9. This cam turns one revolution while the tap is turning the angular distance of one land and one flute, and when grinding the land uses that part of its rotation from A to B. If, when the top is set with a cutting edge on a plane coincident with the axes of the tap and grinding wheel and the quill 189 is set so that the pointer 1890 is opposite to the letter R for right hand taps, as shown in Figure 8, or opposite to the letter L for left hand taps, as shown in Figure 9, the lever 170 is in vertical position in line with the direction of adjustment of its fulcrum for controlling the amount of relief. Any adjustment of the lever vertically as by turning the screw 175 will not change the effective diameter of the tap. It is therefore possible, having adjusted the machine to grind the proper diameter to vary the amount of relief without varying the diameter since variation of the relief does not vary the starting point of grinding at the cutting edges of the lands which lead in the direction of rotation of the work.

A grinding wheel 36 is suitably supported on a traversing movable carriage on the work bed 1, as, for example, as shown in my Patent No. 2,187,227 hereinbefore mentioned, and this grinding wheel may be driven from a motor 37 as through a belt drive 38 as also shown in my patent.

From the foregoing description of an embodiment of this invention, it should be evident to those skilled in the art that various changes and modifications might be made without departing from the spirit or scope of this invention as defined by the appended claims.

I claim:

1. In combination, a machine bed, a tailstock carried by said bed, means for fixing said tailstock to said bed, a work supporting spindle mounted for axial motion in said tailstock, an axially movable bar mounted substantially parallel with the axis of said spindle, means for locking said spindle and bar together for simultaneous axial motion, a work engaging center block axially movable with respect to said spindle, and yielding means tending to hold said block at an outer limit of such axial motion.

2. In combination, a machine bed, a tailstock carried by said bed, means for fixing said tailstock to said bed, a work supporting spindle mounted for axial motion in said tailstock, an axially movable bar mounted substantially parallel with the axis of said spindle, and means connecting said spindle and bar together for simultaneous axial motion and including mechanism actuable to move said spindle axially with respect to said bar, a work engaging center block axially movable with respect to said spindle, and yielding means tending to hold said block at an outer limit of such axial motion.

3. In combination, a work supporting spindle, a stock supporting said spindle for axial motion relative to said stock, means for moving said spindle axially comprising a rack bar mounted for motion substantially parallel to the axis of said spindle and relative to said stock, means for moving said rack bar axially, and means engageable with the teeth of said rack bar and operatively connected to said spindle causing motion of said rack bar relative to said stock to move said spindle relative to said stock.

4. In combination, a work supporting spindle, means supporting said spindle for axial motion, means for moving said spindle axially comprising a rack bar mounted for motion substantially parallel to the axis of said spindle, means for moving said rack bar axially, a casing slidable axially of said rack bar and connected to said spindle, a shaft journaled in said casing, a pinion frictionally attached to said shaft and meshing with the teeth of said rack bar, an actuating handle carried by said shaft, and a latch for releasably holding said handle in a predetermined angular position.

5. In combination, a hollow spindle, means supporting said spindle for axial motion, a sleeve axially slidable within said spindle, a spring bearing on said sleeve and yieldingly pressing said sleeve toward an outer limit of axial motion, a center block rockably supported by said sleeve at the outer end of said sleeve and having a shank extending inwardly thereof, a member carried by said shank and extending through a slot in said spindle, means for moving said spindle axially, and means engaging said member for rocking said center block.

6. In combination, a center block having a shank, means supporting said block for rocking motion about an axis transverse to said shank, a cone center carried by said block, a lever, operative connections from said lever to said shank, means for rocking said lever thereby rocking said center block and oscillating said center, and means for moving said lever to adjust the fulcrum of said lever relative to said operative connections to thereby vary the amplitude of motion of said center for a given amplitude of rocking of said lever.

7. In combination, a work center, means supporting said work center for motion about a transverse pivot laterally of its axis, means for producing such lateral motion comprising a lever, operative connections between said lever and center at one side of said pivot to cause rocking of said lever to produce lateral motion of said center, means of constant stroke for rocking said lever, and means for moving said lever to adjust the relation of its fulcrum to said operative connections to thereby adjust the amplitude of motion of said work center.

8. In combination, a machine bed, means including a tailstock for supporting fluted work for rotation, a work engaging element carried by said tailstock, means for oscillating said work engaging element in time with the rotation of the work to provide relief for the lands between the flutes of said work by a tool presented to the work during its rotation, said oscillating means including a cam, and adjacent driving parts marked to indicate adjustment of said cam to adjust the angular direction of relief in accordance with whether the work is right or left hand.

9. In combination, a machine bed, means including a tailstock for supporting fluted work for rotation, a work engaging element carried by said tailstock, means for oscillating said work engaging element in time with the rotation of the work to provide relief for the lands between the flutes of said work by a tool presented to the work during its rotation, said oscillating means including connections including a lever rockable to oscillate said element, a rotary cam engaging said lever to effect such oscillation, and means for rotating said cam once for each complete oscillation, said rotating means having adjacent driving parts marked for adjustment of said cam angularly to determine the direction of oscillation while the lands between the flutes of the work are being operated upon by the tool, to thereby determine the angular direction of the relief in accordance with whether the work is right or left hand.

10. In combination, a machine bed, means including a tailstock for supporting fluted work for rotation, a work engaging element carried by said tailstock, means for oscillating said work engaging element in time with the rotation of the work to provide relief for the lands between the flutes of said work by a tool presented to the work during its rotation, said oscillating means including connections including a lever rockable to oscillate said element, a rotary cam engaging said lever to effect such oscillation, and means for rotating said cam once for each complete oscillation, said means having parts marked to show adjustment of said cam angularly with relation to said rotating means to correctly relate the oscillation of said lever to produce relief of the lands of the work whether right or left hand.

11. In combination, a work center, means supporting said work center for motion laterally of its axis, means for producing such lateral motion comprising a lever, operative connections between said lever and center to cause rocking of said lever to produce lateral motion of said center, a cam operatively engaging said lever, a slide block to which said lever is fulcrumed, means for adjusting said slide block to thereby adjust the position of said fulcrum with relation to said cam and to said operative connections and thereby adjust the amplitude of lateral motion of said work center produced by action of said cam, and means for driving said cam.

12. In combination, a work center, means supporting said work center for motion laterally of its axis, means for producing such lateral motion comprising a lever, operative connections between said lever and center to cause rocking of said lever to produce lateral motion of said center, a cam operatively engaging said lever, a slide block to which said lever is fulcrumed, a member threaded into said slide block, means supporting said threaded member for rotation but against axial motion to cause rotation of said threaded member to move said slide block and adjust the position of said fulcrum with relation to said cam and to said operative connections and thereby adjust the amplitude of lateral motion of said work center produced by action of said cam, and means for driving said cam.

13. In combination, a hollow spindle, means supporting said spindle for axial motion, a sleeve axially slidable within said spindle, a spring bearing on said sleeve and yieldingly pressing said sleeve toward an outer limit of axial motion, a center block rockably supported at the outer end of said sleeve and having a shank extending inwardly thereof, a member carried by said shank and extending through a slot in said spindle, means for moving said spindle axially, means engaging said member for rocking said center block, and means for adjusting said member with respect to said shank.

14. In combination, a center block having a shank portion, means supporting said block for rocking motion, a cone center carried by said block, a lever, operative connections from said lever to said shank, means for rocking said lever thereby rocking said center block and oscillating said center, means for adjusting the fulcrum of said lever relative to said operative connections to thereby vary the amplitude of motion of said center for a given amplitude of rocking of said lever, a rotary driving member, connections from said driving member for rocking said lever, and means for adjusting said last mentioned connections to adjust the timing of oscillation of said center to either of two definite angular positions of said driving member suitable for right or left hand fluted work, respectively.

RALPH E. FLANDERS.